(12) United States Patent
Yoshida

(10) Patent No.: US 6,628,337 B1
(45) Date of Patent: Sep. 30, 2003

(54) ELECTRONIC CAMERA WITH INTERNAL TEMPERATURE INCREASE CONTROLLED

(75) Inventor: Shinichi Yoshida, Kawasaki (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/837,028

(22) Filed: Apr. 18, 2001

(51) Int. Cl.[7] .............................................. H04N 5/225
(52) U.S. Cl. ............. 348/372; 348/207.99; 348/333.13; 396/205; 396/301
(58) Field of Search ........................... 345/99, 211, 212, 345/213; 396/97, 205, 206, 301; 348/342, 335, 340, 360, 361, 372, 333.13

(56) References Cited

U.S. PATENT DOCUMENTS 6,331,844 B1 * 12/2001 Okumura et al. ........... 345/100
6,351,611 B1 * 2/2002 Nonaka ...................... 396/203
6,504,155 B1 * 1/2003 Ookawa ..................... 250/352

* cited by examiner

*Primary Examiner*—Wendy R. Garber
*Assistant Examiner*—Matthew L. Rosendale
(74) *Attorney, Agent, or Firm*—Pamela R. Crocker

(57) ABSTRACT

A camera is made compact with its internal temperature adjusted to a more appropriate temperature. A temperature T is read from a temperature sensor disposed within the camera (S100) and it is judged whether or not the temperature T exceeds a threshold Tref1 (S102). When the temperature T exceeds the threshold Tref1, the operation of the camera is changed to a power-saving mode where the power consumption is lower than in the ordinary mode (S104). The threshold Tref1 is determined to be a rated temperature at which the camera can operate stably or a temperature lower than that. Thus, the temperature in the camera can be made appropriate.

4 Claims, 3 Drawing Sheets

ELECTRONIC CAMERA WITH INTERNAL TEMPERATURE INCREASE CONTROLLED

BACKGROUND OF THE INVENTION

1. Field of the Invention

The present invention relates to an electronic camera, and more particularly to a portable electronic camera comprised of a plurality of component devices.

2. Description of the Related Art

Conventionally, such an electronic camera of the type described above is proposed to automatically shut off the power being supplied to the component devices constituting the electronic camera when the operation temperature increasing owing to the operation of the electronic camera becomes a predetermined temperature or higher. This camera cuts off a supply of power to the devices to prevent the operation temperature of the camera from increasing to a predetermined temperature or higher, thereby protecting it and securing a user's safety.

However, such a camera merely cuts off the power to the devices and often has a short period of usable time, such as when an outside-air temperature is high for example. To remedy such a problem, a separate cooling device may be attached to suppress the operation temperature of the camera from increasing, but the addition of the cooling device makes the whole camera bigger.

SUMMARY OF THE INVENTION

It is an object of the invention to provide an electronic camera which can control internal temperature to a more appropriate level. It is another object of the invention to provide an electronic camera which is compact and can control internal temperature to a more appropriate level.

The electronic camera of the invention is provided with the following means in order to at least partially achieve the above-mentioned objects.

The electronic camera of the present invention is an electronic camera which is portable and comprised of a plurality of component devices, comprising a temperature detector for detecting the internal temperature of the electronic camera, and a power consumption controller for controlling power consumed by the equipment depending on the detected temperature.

In the electronic camera of the present invention, the temperature detector detects the temperature in the electronic camera, and the power consumption controller controls the power consumed by the component devices depending on the detected temperature. The electronic camera of the invention controls the power consumed by the devices depending on the temperature inside the camera, so that the temperature in the camera can be adjusted to a more appropriate temperature.

In the electronic camera of the invention, the power consumption controller can be a controller for controlling the equipment so as to have a power-saving mode in which the power consumed by the devices can be made lower than the ordinary power consumption when the temperature inside the electronic camera detected by the temperature detector is higher than a first predetermined temperature. Thus, the temperature in the camera can be prevented from increasing to a predetermined temperature or higher.

In the electronic camera of the present invention, the power consumption controller can be a controller for controlling the equipment to return the power consumption by the devices to the ordinary power consumption when the temperature in the electronic camera detected by the temperature detector becomes lower than a second predetermined temperature which is lower than the first predetermined temperature while the devices are operating in the power-saving mode. Thus, the equipment can be operated appropriately depending on the temperature in the camera.

Furthermore, in the electronic camera of the invention, the power consumption controller can also be a controller for pausing the operations of the plurality of devices when the temperature in the electronic camera detected by the temperature detector exceeds a third predetermined temperature which is higher than the first predetermined temperature while the devices are operating in the power-saving mode. Thus, the equipment can be more reliably prevented from breaking down.

In the electronic camera of the invention, the power-saving mode can be at least one of modes where the operation speeds of the equipment are made slower than their speeds in the ordinary power consumption mode, where the operation speed of an image pickup device, which is included in the plurality of equipment and takes a picture of an object, is made slower than its operation speed in the ordinary power consumption mode and where the brightness of the pickup image shown on a display device, which is included in the plurality of devices, is made darker than that in the ordinary power consumption mode.

DESCRIPTION OF THE PREFERRED EMBODIMENT

Figure 1:
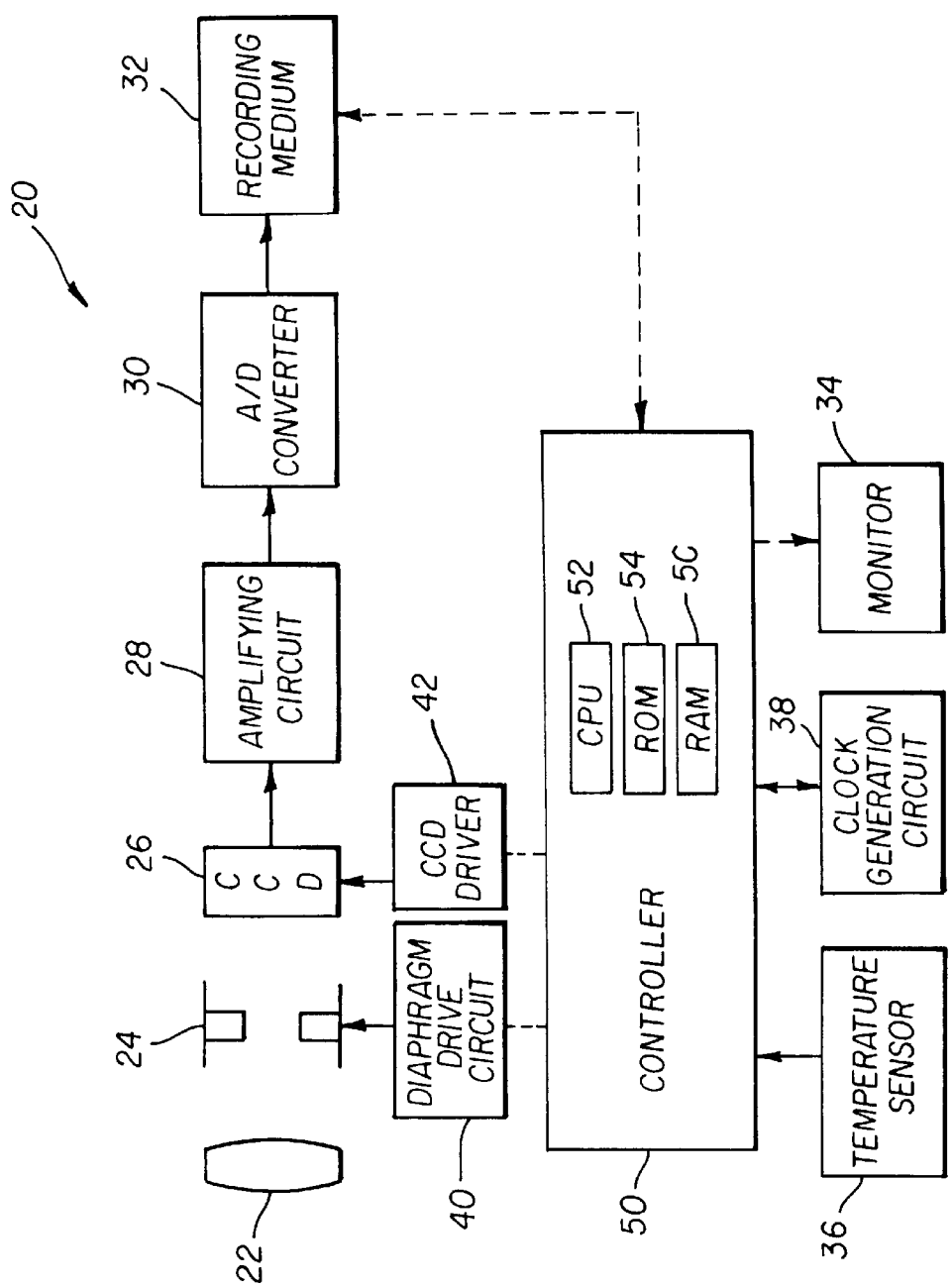
FIG. 1 is a diagram schematically showing the structure of an electronic camera 20 according to one embodiment of the present invention.

An embodiment of the invention will be described with reference to the accompanying drawings. FIG. 1 is a diagram schematically showing the structure of the electronic camera 20 according to one embodiment of the present invention. The electronic camera 20 of this embodiment has a lens 22 which catches an object, a diaphragm 24 which adjusts an amount of light exposure from the object, a CCD 26 which is a solid-state image sensing device for converting the light, which is reflected from the object and entered through the diaphragm 24, into an electric signal, an amplifying circuit 28 for amplifying the converted electric signal, an A/D converter 30 for converting the amplified electric signal into a digital signal, a recording medium 32 (such as a flash memory) for recording the converted digital signal as an image signal, a monitor 34 (such as LCD) for showing an image according to the image signal, a temperature sensor 36 for detecting the temperature in the camera, a clock generation circuit 38 for generating a clock pulse, and a controller 50 for controlling the entire camera.

The controller 50 is configured as a microprocessor having the CPU 52 as the core and is provided with ROM 54 storing a processing program, RAM 56 for temporarily storing data, and I/O ports (not shown). The controller 50 receives a temperature T from the temperature sensor 36, an image signal from the recording medium 32, and a clock pulse signal from the clock generation circuit 38 through the input port. The controller 50 outputs from its output port a diaphragm drive signal to a diaphragm drive circuit 40 for driving the diaphragm 24, a CCD drive signal to a CCD driver 42 for driving the CCD 26, an image signal to the recording medium 32, an output signal to the monitor 34, and a clock pulse control signal to the clock generation circuit 38.

Figure 2:
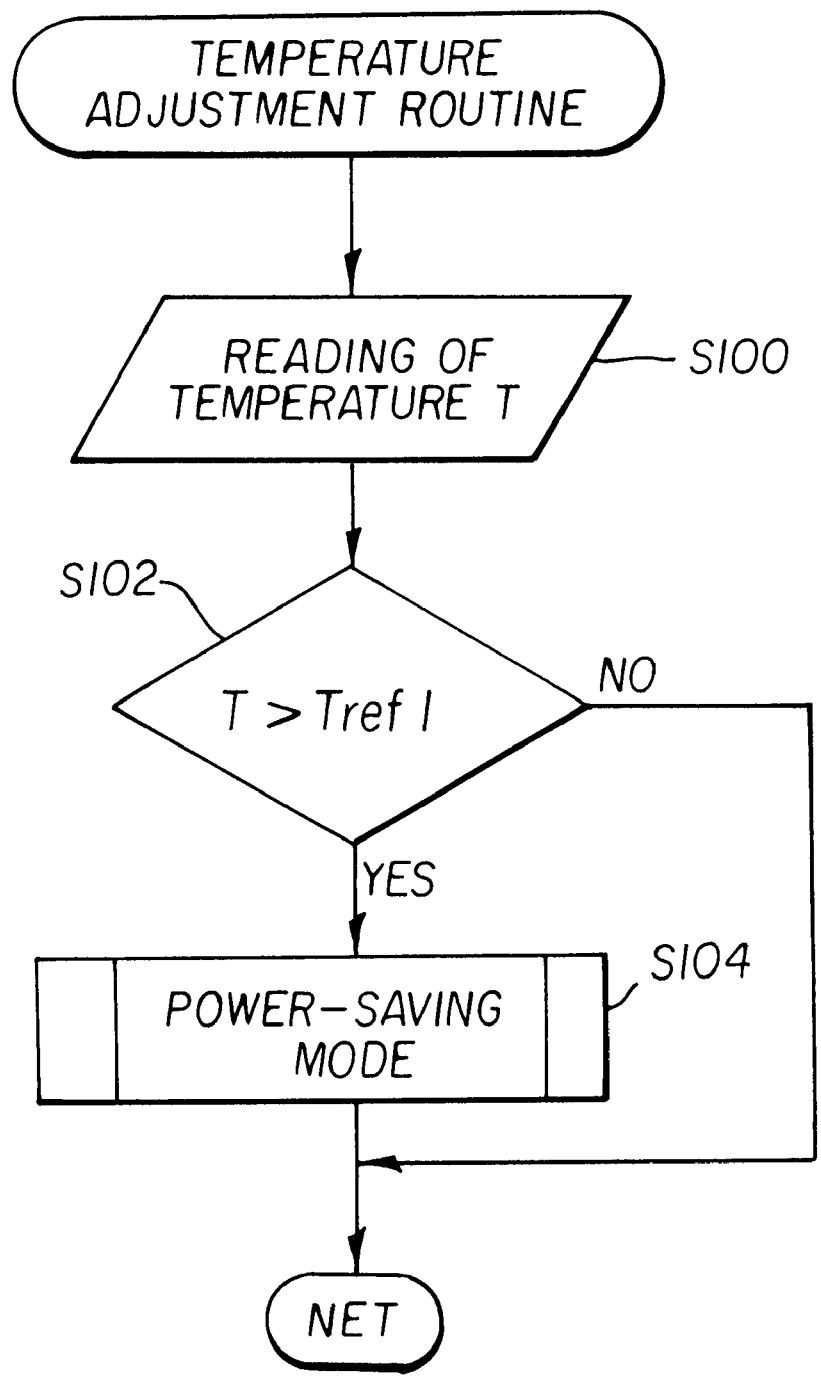
FIG. 2 is a flowchart showing an example of the temperature adjusting routine executed by CPU 52 of a controller 50.

An operation of the electronic camera 20 of the embodiment configured as described above, and more particularly an operation for controlling the temperature in the camera, will be described. FIG. 2 is a flowchart showing an example of a temperature adjusting routine performed by the CPU 52 of the controller 50. This routine is repeatedly executed at predetermined time intervals (e.g., every 10 msec.) after starting the operation of the electronic camera 20.

When the temperature adjusting routine is started, the CPU 52 of the controller 50 reads the temperature T from the temperature sensor 36 (step S100) and judges whether or not the read temperature T exceeds a threshold Tref1 (Step S102). The threshold Tref1 is a threshold determined as a rated temperature at which the stable operation of the camera can be secured or a temperature slightly lower than that temperature. When it is judged that the temperature T is not higher than the threshold Tref1, the temperature in the camera is judged appropriate, and the routine is terminated without performing any processing. Meanwhile, when the temperature T exceeds the threshold Tref1, a power-saving mode is selected as an operation mode of the camera (step S104). This power-saving mode is a mode determined to operate the camera with power consumption reduced to a level lower than usual (hereinafter called the ordinary mode) and operates the camera according to the power-saving mode operation routine exemplified in FIG. 3.

Figure 3:
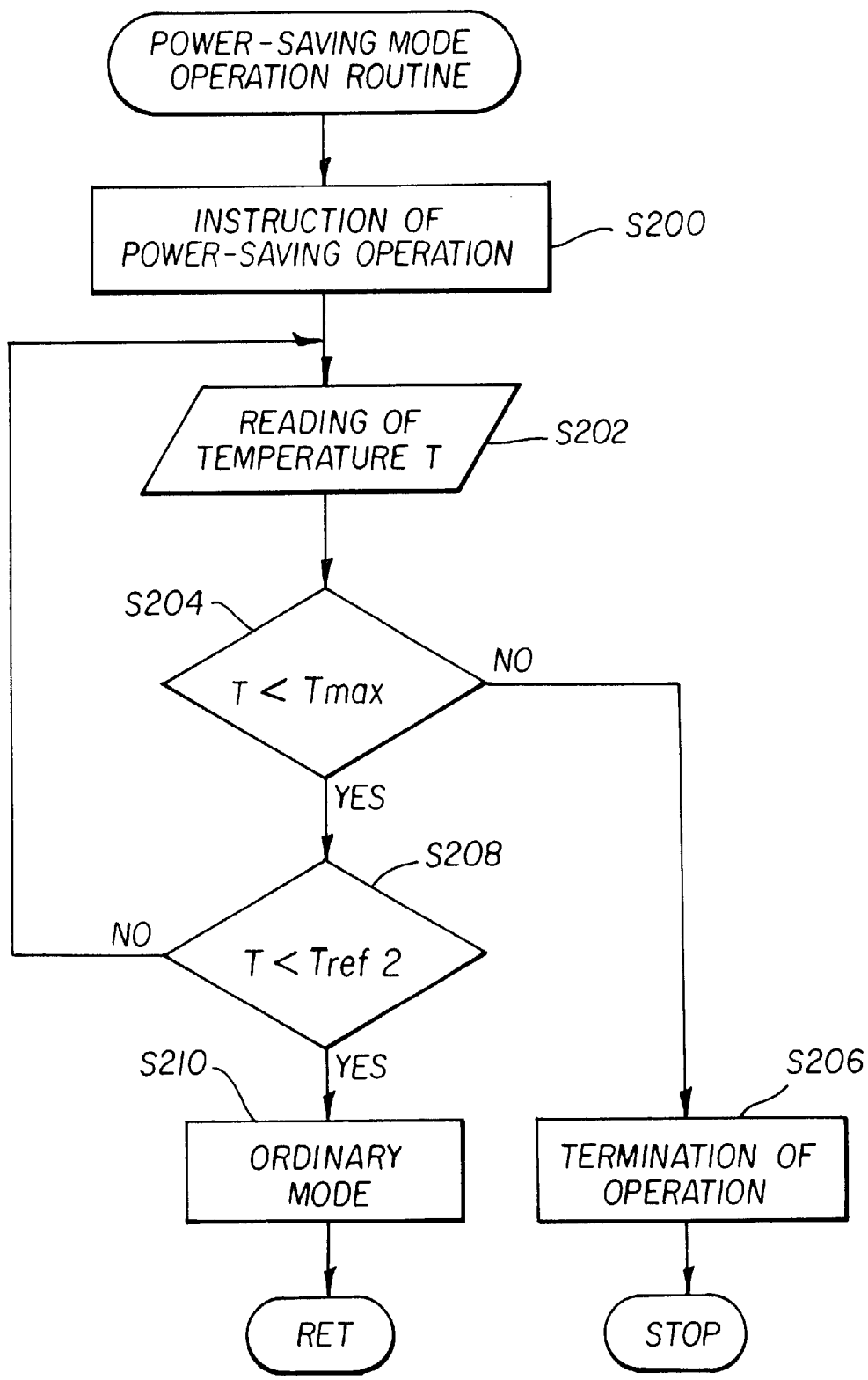
FIG. 3 is a flowchart showing an example of the power-saving mode operation routine performed by the CPU 52 of the controller 50.

When the power-saving operation routine of FIG. 3 is executed, it instructs operation in the power-saving mode (step S200). In this process, a charge transfer speed of the CCD 26 is lowered by outputting a CCD drive signal to the CCD driver 42 to lower the voltage pulse in frequency, an operation speed of the controller 50 is lowered by outputting the clock pulse control signal to the clock generating circuit 38 to lower the operation frequency of the controller 50, or the display screen is made darker by outputting an output signal to the monitor 34 to make, for example, a backlight for displaying dark, so as to suppress the power consumption to prevent the temperature inside the camera from increasing.

Thus, after instructing the operation in the power-saving mode, the temperature T is read from the temperature sensor 36 (step S202). It is then judged whether or not the read temperature T is lower than a threshold Tmax (step S204). The threshold Tmax is a threshold determined to be a temperature at which the camera will break down or have a high possibility of causing a problem in it to influence the safety of the user, or a temperature slightly lower that temperature. It is determined to be a temperature value higher than the threshold Tref1. A specific value is decided according to the performance, such as durability of the devices in the camera. When it is judged that the temperature T is not lower than the threshold Tmax, it is determined that the camera might break down or the like. Also, the operation of the camera is stopped (step S206) to terminate this routine. Meanwhile, when it is judged that the temperature T is lower than the threshold Tmax, it is judged whether or not the temperature T is lower than a threshold Tref2 (step S208). The threshold Tref2 is a threshold determined as a temperature lower than the rated temperature at which the stable operation of the camera can be secured and lower than the aforesaid threshold Tref1. Thus, a frequent changeover between the power-saving mode and the ordinary mode caused by assuming the same temperature value for the threshold Tref2 and the threshold Tref1 can be prevented. When it is judged that the temperature T is not lower than the threshold Tref2, the process returns to the step S202 to repeat the aforesaid procedures. Meanwhile, when it is judged that the temperature T is lower than the threshold Tref2, it is determined that the temperature in the camera has restored to the appropriate temperature. Then, the processing to return to the operation in the ordinary mode is performed (step S210), and this routine is terminated. The process then returns to the routine of FIG. 2. After that, the routine of FIG. 2 is also terminated.

The electronic camera 20 of the invention described above can suppress the internal temperature from increasing so to have a more appropriate temperature within the camera by switching the operation to the power-saving mode when the temperature T in the camera exceeds the threshold Tref1. Besides, when the temperature T in the camera exceeds the threshold Tmax, the operation of the camera is stopped, so that the camera is prevented from breaking down, and the user's safety can be secured. Switching from the power-saving mode to the ordinary mode is made when the temperature T within the camera becomes the threshold Tref2 which is lower than the threshold Tref1. Thus, frequent switching between the power-saving mode and the ordinary mode can be prevented. Also, the camera can be made compact because a separate cooling device is not necessary when controlling as described above.

The electronic camera 20 of the embodiment is designed to return its operation to the ordinary mode when the temperature T in the camera operating in the power-saving mode becomes lower than the threshold Tref2 which is a temperature value lower than the threshold Tref1 but may be designed to return the operation to the ordinary mode when the temperature T in the camera becomes lower than the threshold Tref1. The electronic camera 20 of the embodiment operates in the power-saving mode by decreasing an electric charge transfer rate of the CCD 26, decreasing the operation speed of the controller 50, and darkening the brightness of the display screen of the monitor 34. However, it may be designed to operate one of the above three as the power-saving mode or to selectively operate any two among them. Besides, another power-saving operation other than those described may be performed.

Furthermore, the electronic camera 20 of the embodiment described above is a so-called still camera but may be a video camera or the like.

While there has been described that what is at present considered to be a preferred embodiment of the invention, it is to be understood that various modifications may be made thereto, and it is intended that the appended claims cover all such modifications as fall within the true spirit and scope of the invention.

FIG. 1

| 20 | electronic camera |
| 22 | lens |
| 24 | diaphragm |
| 26 | CCD |
| 28 | amplifying circuit |

-continued

| | | |
|---|---|---|
| 30 | A/D converter | |
| 32 | recording medium | |
| 34 | monitor | |
| 36 | temperature sensor | |
| 38 | clock generation circuit | |
| 40 | diaphragm drive circuit | |
| 42 | CCD driver | |
| 50 | controller | |
| 52 | CPU | |
| 54 | ROM | |
| 56 | RAM | |

FIG. 2
temperature adjusting routine

| | |
|---|---|
| S100 | reading of temperature T |
| S104 | power-saving mode |

FIG. 3
power-saving mode operation routine

| | |
|---|---|
| S200 | instruction of power-saving operation |
| S202 | reading of temperature T |
| S206 | termination of operation |
| S210 | ordinary mode |

What is claimed is:

1. An electronic camera which is portable and comprised of a plurality of devices, comprising:

a temperature detector for detecting the internal temperature of the electronic camera, and a power consumption controller for controlling power consumed by the devices depending on the detected temperature so as to have a power-saving mode where the power consumption by the devices is lowered to a level at least lower than ordinary power consumption when the temperature in the electronic camera detected by the temperature detector exceeds a first predetermined temperature, and wherein the power consumption by the devices is returned to the ordinary power consumption when the temperature in the electronic camera detected by the temperature detector is lower than a second predetermined temperature which is lower than the first predetermined temperature while the devices are operating in the power-saving mode.

2. An electronic camera which is portable and comprised of a plurality of devices, comprising:

a temperature detector for detecting the internal temperature of the electronic camera, and a power consumption controller for controlling power consumed by the devices depending on the detected temperature so as to have a power-saving mode where the power consumption by the devices is lowered to a level at least lower than ordinary power consumption when the temperature in the electronic camera detected by the temperature detector exceeds a first predetermined temperature, and wherein the power consumption controller stops the operations of the plurality of devices when the temperature in the electronic camera detected by the temperature detector exceeds a third predetermined temperature which is higher than the first predetermined temperature while the devices are operating in the power-saving mode.

3. An electronic camera which is portable and comprised of a plurality of devices, comprising:

a temperature detector for detecting the internal temperature of the electronic camera, and a power consumption controller for controlling power consumed by the devices depending on the detected temperature so as to have a power-saving mode where the power consumption by the devices is lowered to a level at least lower than ordinary power consumption when the temperature in the electronic camera detected by the temperature detector exceeds a first predetermined temperature, and wherein the power-saving mode is at least one of modes where the operation speeds of the devices are made slower than their speeds in the ordinary power consumption, where the operation speed of an image pickup device, which is included in the plurality of devices and takes a picture of an object, is made slower than its operation speed in the ordinary power consumption, and where the brightness of the pickup image shown on a display device, which is included in the plurality of devices, is made darker than that in the ordinary power consumption.

4. An electronic camera which is portable and comprised of a plurality of devices, comprising:

a temperature detector for detecting the internal temperature of the electronic camera, and a power consumption controller for controlling power consumed by the devices depending on the detected temperature so as to have a power-saving mode where the power consumption by the devices is lowered to a level at least lower than ordinary power consumption when the temperature in the electronic camera detected by the temperature detector exceeds a first predetermined temperature, and wherein the power-saving mode is at least one of modes where the operation speeds of the devices are made slower than their speeds in the ordinary power consumption, where the brightness of an image captured by an image pickup device and shown on a display device, which is included in the plurality of devices, is made darker than that in the ordinary power consumption.

* * * * *